United States Patent Office.

JOSEPH KLECKNER, OF MOTTVILLE, MICHIGAN.

Letters Patent No. 100,706, dated March 8, 1870.

IMPROVED CEMENT TO BE USED IN SEWERS AND DRAINS, AND FOR CONSTRUCTING FLUES AND OTHER PARTS OF BUILDINGS.

The Schedule referred to in these Letters Patent and making part of the same.

To all whom it may concern:

Be it known that I, JOSEPH KLECKNER, of Mottville, in the county of St. Joseph, in the State of Michigan, have invented a new and Improved Cement; and I do hereby declare that the following is a full, clear, and exact description of the same.

My cement is composed of one-tenth hydraulic cement, the common water-lime, one-eighth fine white sand, the residue being the common finely-powdered plaster of Paris, for any specified quantity.

The materials in these proportions are then put together and thoroughly mixed, so that each of the parts shall be uniformly distributed throughout the mass. Care must be taken in their admixture to have them perfectly dry and free from dampness.

The composition being thus prepared, add enough water to make it sufficiently liquid to run freely.

I have found by experience that the New York lime is much more preferable in making my cement than the common water-lime or hydraulic cement, as the latter varies much in its strength, and the least weakness of this cement I have discovered is a bar to the perfect union and attraction of the materials, one for another.

I have also found that it is absolutely important that the proportions above indicated must be strictly adhered to, as the least particle too much of either one of the ingredients for a specified quantity will weaken their affinity for each other, and instead of resulting in a hard, stone-like, durable compound, will tend to produce disintegration or cracking.

The ingredients thus proportioned and thoroughly mixed must be in this state at the place where the cement is to be used, and the mold must be ready to receive it before the water is added to it.

In adding the water the cement must be stirred very quickly and thoroughly, and poured into the mold without the least delay, when in a very short time it perfectly hardens throughout, and forms a solid, stone-like mass, and can be polished to assume a marble-like smoothness.

This composition can be used for forming flues in buildings, tubes, and for other purposes, and I have found from use that the effect of heat thereon does not flake or crack it, but tends rather to toughen and harden in. I have also found it to be impenetrable and not affected by water, and to be well adapted for use as conduits.

This cement cannot be made in large bulk, but must be made in such quantities as to admit of its use without standing, as the chemical process of hardening commences so soon after the application of the water that it requires to be used at once.

A flue can be cheaply and quickly made from this cement and used where any other flue or thimble can be, vertically or horizontally through partitions, floors, and walls. It can also be used as a smoke and heat-conductor from the cellar to the top of the building, by being molded in sections, and built up and united with the cement at each joint, thus making a continuous chimney of it.

As the method of constructing a flue of this cement forms the subject of another application for a patent bearing even date herewith, it need not be particularly described.

Having described my invention,

I claim the cement composed of the materials in the specified quantities herein stated, prepared, compounded, and used substantially as described.

JOSEPH KLECKNER.

Witnesses:
S. O. COFFINBERRY,
DAN. M. HARVEY.